United States Patent
Gordon et al.

(10) Patent No.: US 7,996,902 B1
(45) Date of Patent: Aug. 9, 2011

(54) SYSTEM AND METHOD FOR CERTIFYING THAT DATA RECEIVED OVER A COMPUTER NETWORK HAS BEEN CHECKED FOR VIRUSES

(75) Inventors: Bryson Gordon, Campbell, CA (US); Gary Zandstra, San Jose, CA (US); Ravi Kannan, Chennai (IN)

(73) Assignee: McAfee, Inc., Santa Clara, CA (US)

( * ) Notice: Subject to any disclaimer, the term of this patent is extended or adjusted under 35 U.S.C. 154(b) by 608 days.

(21) Appl. No.: 11/478,930

(22) Filed: Jun. 30, 2006

Related U.S. Application Data

(62) Division of application No. 09/965,562, filed on Sep. 25, 2001, now Pat. No. 7,107,618.

(51) Int. Cl.
*G06F 12/14* (2006.01)

(52) U.S. Cl. ............... 726/24; 726/22; 726/25
(58) Field of Classification Search ............ 726/22, 726/24–25
See application file for complete search history.

(56) References Cited

U.S. PATENT DOCUMENTS

| | | | |
|---|---|---|---|
| 5,832,208 A | 11/1998 | Chen et al. | 726/24 |
| 5,978,768 A * | 11/1999 | McGovern et al. | 705/1 |
| 6,021,510 A * | 2/2000 | Nachenberg | 714/38 |
| 6,029,256 A | 2/2000 | Kouznetsov | 714/38 |
| 6,035,423 A | 3/2000 | Hodges et al. | 714/38 |
| 6,119,165 A * | 9/2000 | Li et al. | 709/229 |
| 6,131,162 A * | 10/2000 | Yoshiura et al. | 713/176 |
| 6,611,925 B1 * | 8/2003 | Spear | 714/38 |
| 6,658,394 B1 | 12/2003 | Khaishgi et al. | 705/58 |
| 6,721,721 B1 * | 4/2004 | Bates et al. | 707/1 |
| 6,789,200 B1 * | 9/2004 | Fiveash et al. | 726/1 |
| 6,928,550 B1 | 8/2005 | Le Pennec et al. | 726/1 |
| 6,976,271 B1 * | 12/2005 | Le Pennec et al. | 726/24 |
| 6,986,051 B2 * | 1/2006 | Le Pennec et al. | 713/188 |
| 7,080,407 B1 * | 7/2006 | Zhao et al. | 726/24 |
| 7,533,272 B1 | 5/2009 | Gordon et al. | 713/188 |
| 2001/0020272 A1 * | 9/2001 | Le Pennec et al. | 713/200 |
| 2001/0034743 A1 * | 10/2001 | Thomas | 707/501.1 |
| 2002/0069263 A1 | 6/2002 | Sears et al. | 709/218 |
| 2002/0091697 A1 | 7/2002 | Huang et al. | 707/10 |
| 2002/0129002 A1 | 9/2002 | Alberts et al. | 707/1 |
| 2002/0147915 A1 * | 10/2002 | Chefalas et al. | 713/188 |
| 2004/0003248 A1 * | 1/2004 | Arkhipov | 713/170 |
| 2004/0078564 A1 * | 4/2004 | Abdulhayoglu | 713/156 |
| 2004/0143763 A1 | 7/2004 | Radatti | 713/201 |

OTHER PUBLICATIONS

LRZone, "LRZone Professional Website Design Services: FAQ", May 24, 2000.*
Jim Bruene, "VeriSign Becoming Synonymous with Net Security", May 1, 1999.*

(Continued)

*Primary Examiner* — Peter Poltorak
(74) *Attorney, Agent, or Firm* — Wong, Cabello, Lutsch, Rutherford & Brucculeri, L.L.P.

(57) ABSTRACT

A system, method, and computer program product are provided for certifying that content available on a host site is free from viruses identified by an anti-virus database. Content configured for publication on a host site is scanned for viruses. The scanned content is loaded onto the host site if no viruses are identified. Further, a certificate is displayed identifying the content on the host site as being scanned for viruses.

19 Claims, 8 Drawing Sheets

OTHER PUBLICATIONS

AVG 9 (http://web.archive.org/web/19990826021856/http://www.grisoft.com/html/us_tut7.cfm), Suffolk-L (http://archiver.rootsweb.com/th/read/SUFFOLK/1999-05/092704011.*
ListSrv (Listserv 14.3 Dec. 1999, week 3 (#24).*
Wikipedia (Adobe Flash, Wikipedia, May 1, 2009).*
Sullivan ("Companies add Infection protection to net security", PC Week, v10, n51, Dec. 1993).*
Informa UK Ltd. ("New Virus Control Measures for the Web (Symantec intros new initiative to help curtail the effects of computer viruses distributed over Internet; move encompasses an anti-virus certification program)", Internet for Business, n 4 p. 18 Nov. 1996).*
Brown (Patricia Brown, "Web-Site Anti-Virus Certification (Symantec Corp introduces Protect your Site free Web site antivirus certification program for users of its antivirus software)", Communication Week, n 637, p. 39, ISSN: 0748-8121, Nov. 1996).*
McAfee ("McAfee: McAfee Launches Safe Surf'n Initiative; Provides Free Virus Protection to Web Site and Bulletin Boards; McAfee Now Protects over 10,000 Web Sites and Bulletin Boards", MCAF, Dec. 1996).*
Notice of Allowance from U.S. Appl. No. 11/478,926 which was mailed on Dec. 31, 2008.
Office Action Summary from U.S. Appl. No. 11/478,926 mailed on Jul. 8, 2008.
Outlook 2000 (Microsoft Outlook 98/2000 Tips, http:www.cof.orst.edu/net/software/outlook/tips/, Oct. 22, 2000) with the attached Date Sheet from WayBack Machine.

* cited by examiner

US 7,996,902 B1

SYSTEM AND METHOD FOR CERTIFYING THAT DATA RECEIVED OVER A COMPUTER NETWORK HAS BEEN CHECKED FOR VIRUSES

RELATED APPLICATION(S)

The present application is a divisional of an application filed Sep. 25, 2001 under Ser. No. 09/965,562, now U.S. Pat. No. 7,107,618 which is incorporated herein by reference.

BACKGROUND OF THE INVENTION

The present invention relates generally to an anti-virus system and method, and more particularly, to a system and method for scanning e-mail or content available for download and certifying that the data is free of known viruses.

A huge surge in computer viruses has occurred in the last decade. Computer viruses have gone from an academic curiosity to a persistent, worldwide problem. Today, viruses affect vast numbers of computers in locations throughout the world. A computer virus is generally a manmade destructive computer program or code that is loaded onto a computer system without the knowledge of the user. The computer virus is often a self-replicating program containing code that explicitly copies itself and can infect other programs by modifying them or their environment. Even a simple virus can be dangerous as the virus can quickly use a large portion of the available memory and possibly bring down the computer system.

Viruses can be written for, and spread on, virtually any computing platform. A virus can infect, or become resident in almost any software component, including an application, operating system, system boot code, or device driver. Computer viruses spread by attaching themselves to other programs (e.g., word processing or spreadsheet applications) or to a boot sector of a disk. When an infected file is activated or executed, or when the computer is started from an infected disk, the virus is also executed and attempts to infect other files. Since a virus is software code, it can be transmitted along with any legitimate software that enters the computer environment. Some viruses are capable of transmitting themselves across networks and bypassing security systems. For example, a virus can spread to files on a local area network (LAN) based file server, and from there to other client systems attached to the server. Similarly, systems that run programs from wide area network (WAN) file servers can become infected if the programs on the server are susceptible to infection. In the networked world of the Internet, viruses can rapidly spread.

The term virus generally refers to any destructible or harmful program or code that attempts to hide its possibly malicious function or tries to spread onto as many computers as possible. One common type of virus is a macro virus which is encoded as a macro embedded in a document. Many applications support macro languages which allow the user to embed a macro in a document and have the macro execute each time the document is opened. Once a computer system is infected with a macro virus, the virus can embed itself in all future documents created with the associated application.

Other common viruses include a boot sector virus, which replaces the computer system's master boot record with its own code, a polymorphic virus, which produces varied but operational copies of itself, a Trojan horse, which masquerades as a legitimate software program, and a worm, which can replicate itself and use memory but cannot attach itself to other programs.

Many anti-virus programs have become commercially available for protection against viruses. There are three main types of anti-virus software: activity monitors, integrity checkers, and scanners. Activity monitoring programs attempt to prevent infection before it happens by looking for virus type activity, such as attempts to reformat a disk. Integrity checkers compute a small checksum or hash value for files which are presumably uninfected, and later compare newly calculated values with the original ones to see if the files have been modified. These programs catch unknown viruses as well as known ones. Integrity checkers may be called to check entire disks or they may be resident, checking each program that is about to be executed.

Scanners are the most widely used type of anti-virus program. Virus scanners generally operate in batch mode, scanning all files on a system, hard disk, or floppy disk, when requested by the user, or at set intervals. They look for known viruses by searching disks and files for scan strings or patterns. A scanner may be designed to examine specified disks or files on demand, or it may be resident, examining each program that is about to be executed. Most scanning programs include an update feature that allows the anti-virus program to download profiles of new viruses from the Internet or network resources so that the program can check for new viruses soon after they are discovered. Most scanners also include virus removers which are operable to clean infected files. One example of an anti-virus scanner is McAfee's VSHIELD brand anti-virus scanner.

Viruses are often spread over networks through e-mails or other content received at a computer. Once a virus has infected the computer it is often sent out to e-mail addresses listed in a user's personal address list without the user's knowledge. Thus, even e-mail received by a trusted sender may contain a virus. A user may also download content from a web site hosted by an unknown entity. This content may also contain viruses. In some cases the received e-mail or content may be scanned using one of the methods previously described before the user accesses the data. However, this is often time consuming and in some cases the user may inadvertently open a file without first checking for viruses. Furthermore, the recipient of the data may not have anti-virus software installed on his computer or the anti-virus database used by the software may not be up to date.

There is, therefore, a need for a system and method for certifying that received data is virus free so that an e-mail recipient or other user is reassured that documents are safe to open and do not require virus scanning.

SUMMARY OF THE INVENTION

A system, method, and computer program product are provided for certifying that content available on a host site is free from viruses identified by an anti-virus database. Content configured for publication on a host site is scanned for viruses. The scanned content is loaded onto the host site if no viruses are identified. Further, a certificate is displayed identifying the content on the host site as being scanned for viruses.

BRIEF DESCRIPTION OF THE DRAWINGS

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

The system and method of the present invention allow users to add a certificate to e-mails or host sites indicating that e-mail sent or content available for download has been scanned for viruses and is safe to open. The system and method of the present invention thus reassures recipients that e-mail or files downloaded from a host site are safe to open without requiring the user to scan the data for viruses.

Figure 1:
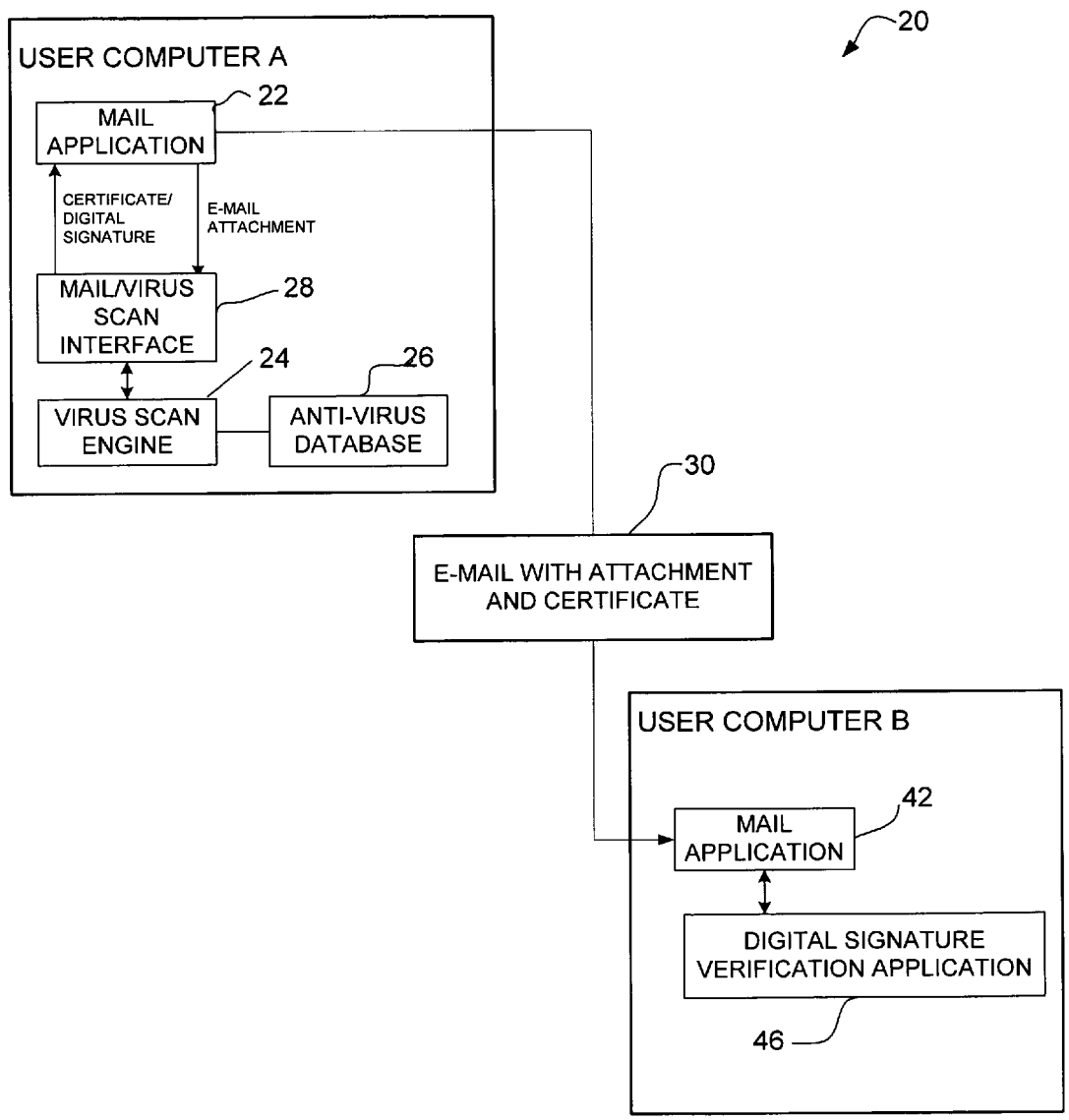
FIG. 1 is a block diagram illustrating a system of the present invention for certification of e-mails sent from a user computer.

Referring now to the drawings, and first to FIG. 1, a system that may utilize the present invention is shown and generally indicated at 20. The system includes two user computers (user computer A and user computer B) in communication with one another. The two computers may be connected over a network such as the Internet, an intranet, a local area network (LAN) or any other type of network. The computers may also be directly connected to one another or any number of other user computers. Transmission media such as T1 and T3 lines, dial-up, DSL (Digital Subscriber Line), cable connections or a wireless connection may provide interconnections between the computers and a network, for example. User computer A includes a desktop based mail application 22 such as MICROSOFT OUTLOOK, QUALCOMM EUDORA, or any other mail application which may be used to compose and send e-mails. User computer A further includes a virus scan engine 24 and an anti-virus database 26 that includes a list of known viruses. A mail/virus scan interface (or certification application) 28 is provided to allow the mail application 22 to use the virus scan engine 24 to scan e-mails created within the mail application and attachments which are part of the e-mail.

When an e-mail is created with the mail application 22 on user computer A and the user clicks on a send button, the e-mail is first sent to the mail/virus scan interface 28 which uses the virus scan engine 24 and anti-virus database 26 to scan the e-mail and attachments for viruses. It is to be understood that the function of the mail/virus scan interface 28 may also be incorporated within the virus scan engine 24 or the mail application 22. Thus, the certification application may be a stand-alone application or may be incorporated within existing anti-virus applications or mail applications, for example. The mail application 22, virus scan engine 24, and anti-virus database 26 may also be integrated into a single application. The scanning is preferably performed automatically without any action required by the user. If the e-mail and attachments are free of viruses a certificate is added to e-mail 30, as shown in FIG. 2.

Figure 2:
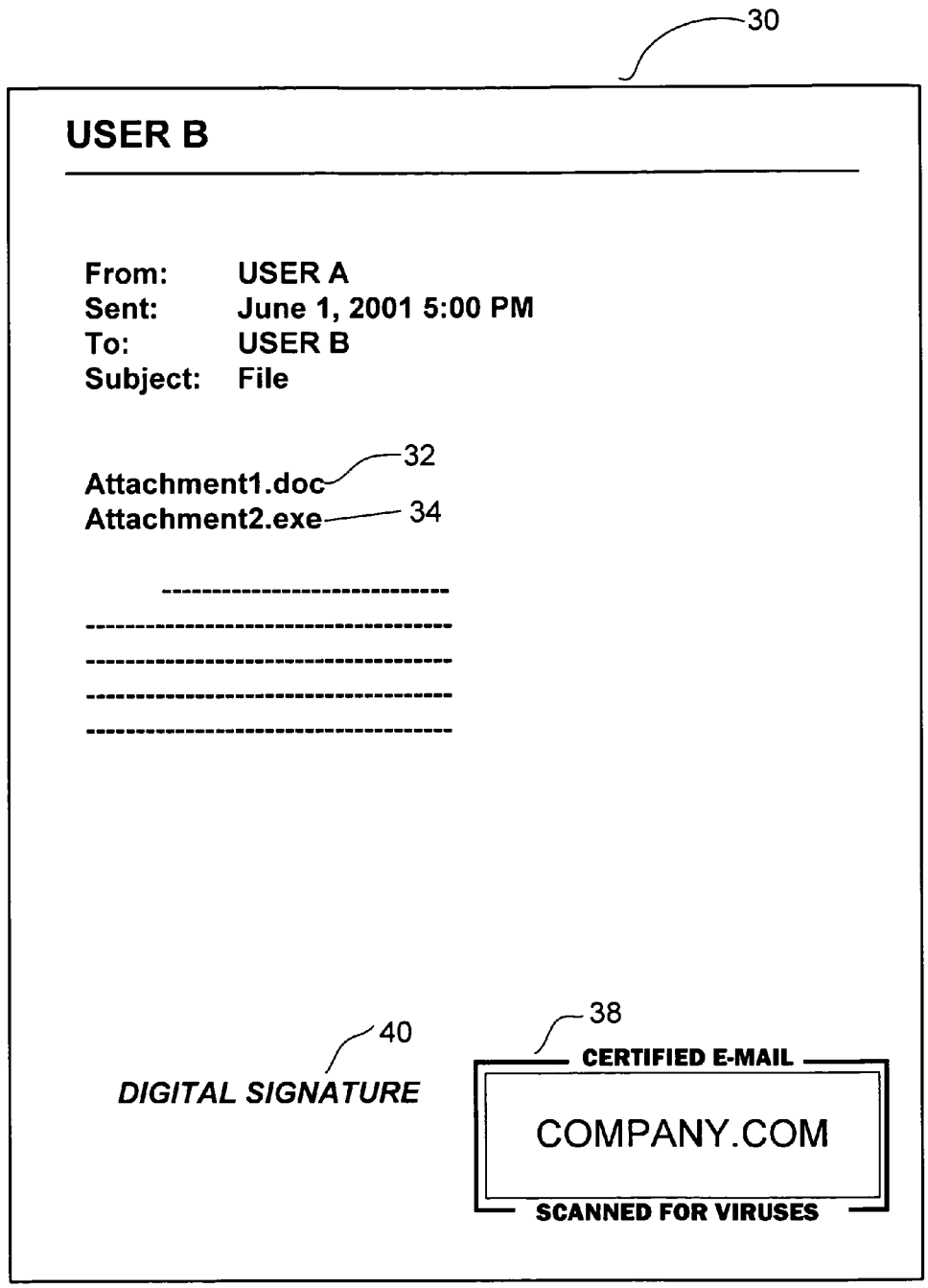
FIG. 2 illustrates an exemplary e-mail having a virus free certificate and digital signature.

FIG. 2 illustrates an exemplary e-mail 30 created by user A on user computer A and sent to user B on user computer B. The e-mail 30 includes two attachments, a text file 32 and an executable file 34. After the e-mail 30 is scanned and found to be free of any known viruses identified within the anti-virus database 26, a certificate 38 (e.g., watermarked seal) is attached to the e-mail by the certification application 28. The certification application 28 then sends the e-mail 30 containing the certificate to user computer B via mail application 22.

A digital signature 40 is preferably also attached to the e-mail 30 stating that the e-mail has not been tampered with between the time it was sent from user computer A and received by user computer B. The digital signature 40 may be created with encryption software such as PGP security software available from PGP Security (a Network Associates Business), or any other security application, as is well known by those skilled in the art.

User B includes a mail application 42 which may be the same as the mail application 22 running on user computer A or a different mail application (FIG. 1). User computer B preferably includes a digital signature verification application 46. The digital signature verification application 46 is configured to read the digital signature 40 imbedded in the e-mail 30 and confirm that the e-mail has not been tampered with. The digital signature verification application 46 may also be included within the mail application 42. The mail/virus san interface 28 or virus scanning software 24 may also incorporate the digital signature verification application 46 so that once a computer is configured to scan e-mails 30 and attach certificate 38 it can also be used to read the digital signature 40 included in e-mail the user receives. When user B views the e-mail 30 from user A, he sees both the certificate 38 and digital signature 40 displayed with the e-mail. If user computer B does not include the digital signature verification application 46 the user will only see the certificate 38 when he views the e-mail.

The certificate (or seal) 38 may be a company logo or any other type of logo and preferably specifies that the e-mail has been scanned for viruses. The certificate 38 may state, for example, that the e-mail is "certified" and has been "scanned for viruses" and specify the company that provided the software that was used to scan the e-mail 30, as shown in FIG. 2. The certificate 38 may also state "certified virus free by x software" or "anti-virus company or software certified site", for example. It is to be understood that any type of certificate having text, graphical images, or a combination thereof may be used. The certificate 38 may also be, for example, just an icon that is recognized as signifying that the e-mail 30 has been scanned for viruses. The certificate 38 is preferably linked to a verification page listing the type and version (or last date of update) of virus scanning software used to scan the e-mail 30. The certificate 38 may thus be clicked on to obtain more information about the certification. Additional information provided may include details on how the user can obtain software to certify his own e-mail or obtain software that can be used to read the digital signature 40 included within the e-mail 30, if the user does not already have this software installed on his computer.

Figure 3:
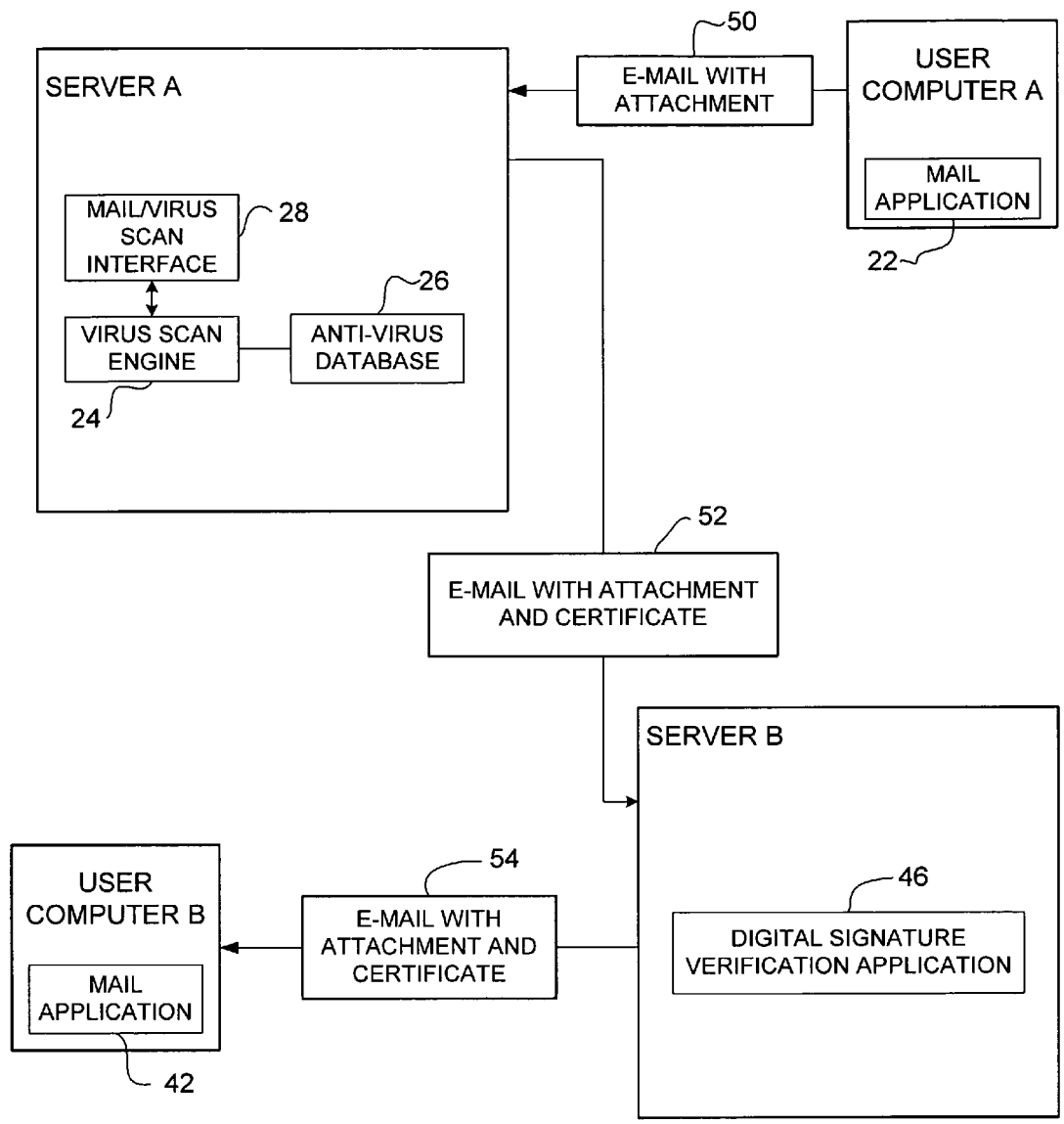
FIG. 3 is a block diagram illustrating a system of the present invention for certification of e-mails sent between user computers in communication with network servers.

As shown in FIG. 3, the scanning and attachment of the certificate may also be performed at a server level. For example, a computer network system such as a local area network (LAN) may be coupled to the Internet with one or more user computers coupled to the computer network. In the system shown in FIG. 3, server A is in communication with server B over a network and user A and user B are each in communication with server A and server B, respectively. The server is a conventional server type computer, preferably supporting a large number of multiple clients simultaneously for requests for data and other processing operations. The server generally comprises a computer that is capable of sending and receiving information over the Internet, storing, retrieving, and maintaining anti-virus files, and running various applications. The server may have, for example, a packet-switched connection to the Internet. The server is preferably kept up to date with the latest releases of anti-virus files. For example, the virus files may be updated monthly, weekly, daily, or even hourly as new viruses are discovered, analyzed, and remedied.

When user A creates e-mail 50 with desktop mail application 22, as previously described, the e-mail is sent to server A which in turn sends the e-mail over the network to the recipient. Server A includes the mail/virus scan interface (certification application) 28, virus scan engine 24, and anti-virus database 26. Before sending the e-mail, the server scans the e-mail and attachments with the virus scan engine 24 and adds certificate 38 and digital signature 40 if no viruses are found. The e-mail 50 may also be scanned at user computer A instead of at server A.

The e-mail 52 with certificate attached is received at server B which forwards e-mail 54 with the digital signature opened to user computer B. As shown in FIG. 3, server B includes the digital signature verification application 46 so that it can read the digital signature and verify that the e-mail 52 has not been tampered with. The digital signature verification application 46 may also be installed on user computer B in which case server B only forwards e-mail 52 to the user computer. If both the user computer and the server have the digital signature verification software 46 installed, the user computer does not need to open and verify the digital signature 40 since the digital signature has already been checked at the server level.

The system of FIG. 1 may also be used to certify that instant message file transfers between a first computer and a recipient computer have been scanned for viruses before they are sent. For example, user computer A and user computer B may be in communication using an instant messenger application such as MICROSOFT NETWORK messenger, YAHOO messenger, or AMERICA ONLINE INSTANT MESSENGER, or any other instant messenger application. The system allows users to automatically add certificate 38 to the body of the file transfer instant message. The instant message may also include digital signature 40, as previously described. The digital signature will appear in the body of the message if the recipient's computer includes digital signature verification application 46.

It is to be understood that the computer networks described above are only examples of networks that may utilize the system and method of the present invention. The computer network may be, for example, a stand-alone network (i.e., not coupled to the Internet) or an Intranet. The computer network may be made up of only two computers in communication with one another, as shown in FIG. 1, or there may be any number of user computers located within the network.

The anti-virus program of the virus scan engine 24 may be an application such as McAfee's VSHIELD, ACTIVESHIELD, SCAN NOW or VIRUSSCAN brand programs, or anti-virus applications described in U.S. Pat. No. 6,029,256, issued Feb. 22, 2000 or U.S. Pat. No. 6,035,423 issued Mar. 7, 2000, which are incorporated herein by reference in their entirety, or any other suitable anti-virus program. The anti-virus program preferably contains an update agent which is resident in the background of the personal computer system and polls for updates at a set interval. Update component versions may be posted on an application server provider (ASP) page located on the Internet, which reports back whether there are newer versions of any of the listed components. The anti-virus program may be installed on the personal computer by a disk or CD-ROM, or downloaded directly from the Internet, for example. The anti-virus program uses virus definitions obtained from the anti-virus database 26 to identify and fix (e.g., clean or delete infected files) viruses located within e-mail. It is to be understood that the anti-virus scanning may be performed on a system different than the one described herein and the components of the anti-virus programs, arrangement of program components, or anti-virus scanner may be different than described herein, without departing from the scope of the invention. Furthermore, it is to be understood that even though the certificate 38 is provided to reassure users that data is virus free, the data may still be infected by a new virus that has not yet been identified and added to the anti-virus database 26.

The user computer may be a stand-alone desktop computer, laptop computer or a handheld device (e.g., personal digital assistant (PDA) or mobile phone), for example. The computer may be a client computer coupled to an Internet service provider over a SLIP (Serial Line Interface Protocol) or PPP (Point to Point Protocol) connection. The Internet service provider is, in turn, coupled to the Internet, the client computer thereby having the ability to send and receive information to other nodes on the Internet using a TCP/IP protocol (Transmission Control Protocol/Internet Protocol).

Figure 4:
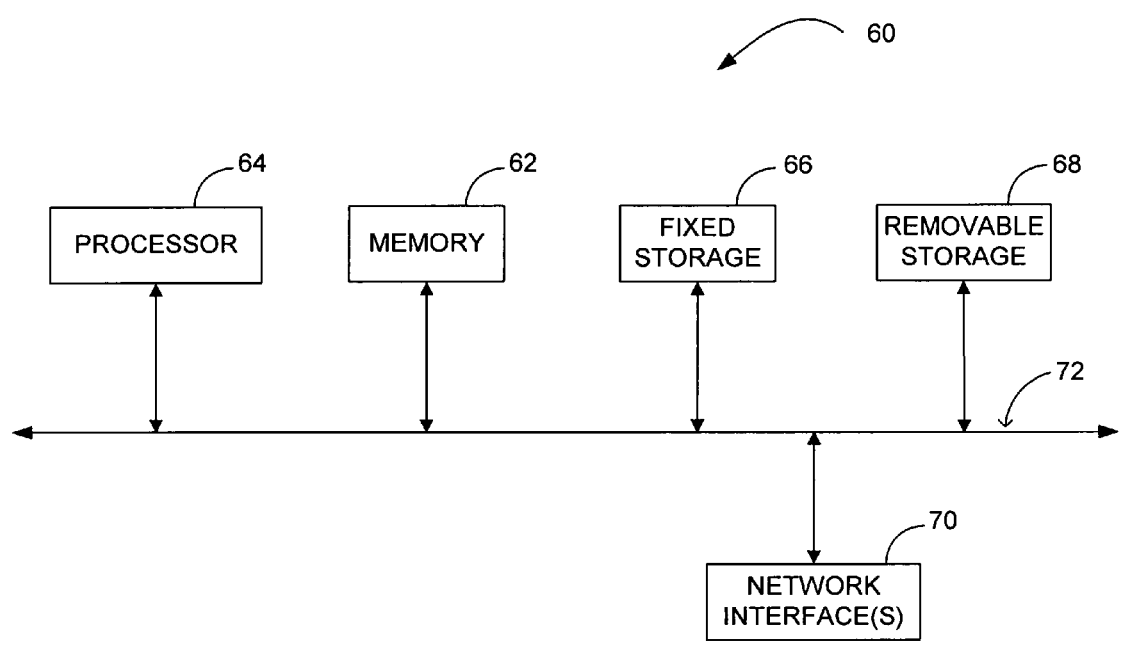
FIG. 4 is a block diagram of a computer system that can be utilized to execute software of an embodiment of the invention.

FIG. 4 shows a system block diagram of computer system 60 that may be used as the user computer, server, or other computer system to execute software of an embodiment of the invention. The computer system 60 includes memory 62 which can be utilized to store and retrieve software programs incorporating computer code that implements aspects of the invention, data for use with the invention, and the like. Exemplary computer readable storage media include CD-ROM, floppy disk, tape, flash memory, system memory, and hard drive. Additionally, a data signal embodied in a carrier wave (e.g., in a network including the Internet) may be the computer readable storage medium. Computer system 60 further includes subsystems such as a central processor 64, fixed storage 66 (e.g., hard drive), removable storage 68 (e.g., CD-ROM drive), and one or more network interfaces 70. Other computer systems suitable for use with the invention may include additional or fewer subsystems. For example, computer system 60 may include more than one processor 64 (i.e., a multi-processor system) or a cache memory. The computer system 60 may also include a display, keyboard, and mouse (not shown) for use as a desktop or laptop computer.

The system bus architecture of computer system 60 is represented by arrows 72 in FIG. 4. However, these arrows are only illustrative of one possible interconnection scheme serving to link the subsystems. For example, a local bus may be utilized to connect the central processor 64 to the system memory 62. Computer system 60 shown in FIG. 4 is only one example of a computer system suitable for use with the invention. Other computer architectures having different configurations of subsystems may also be utilized. Communication between computers within the network is made possible with the use of communication protocols, which govern how computers exchange information over a network, as is well known by those skilled in the art.

Figure 5:
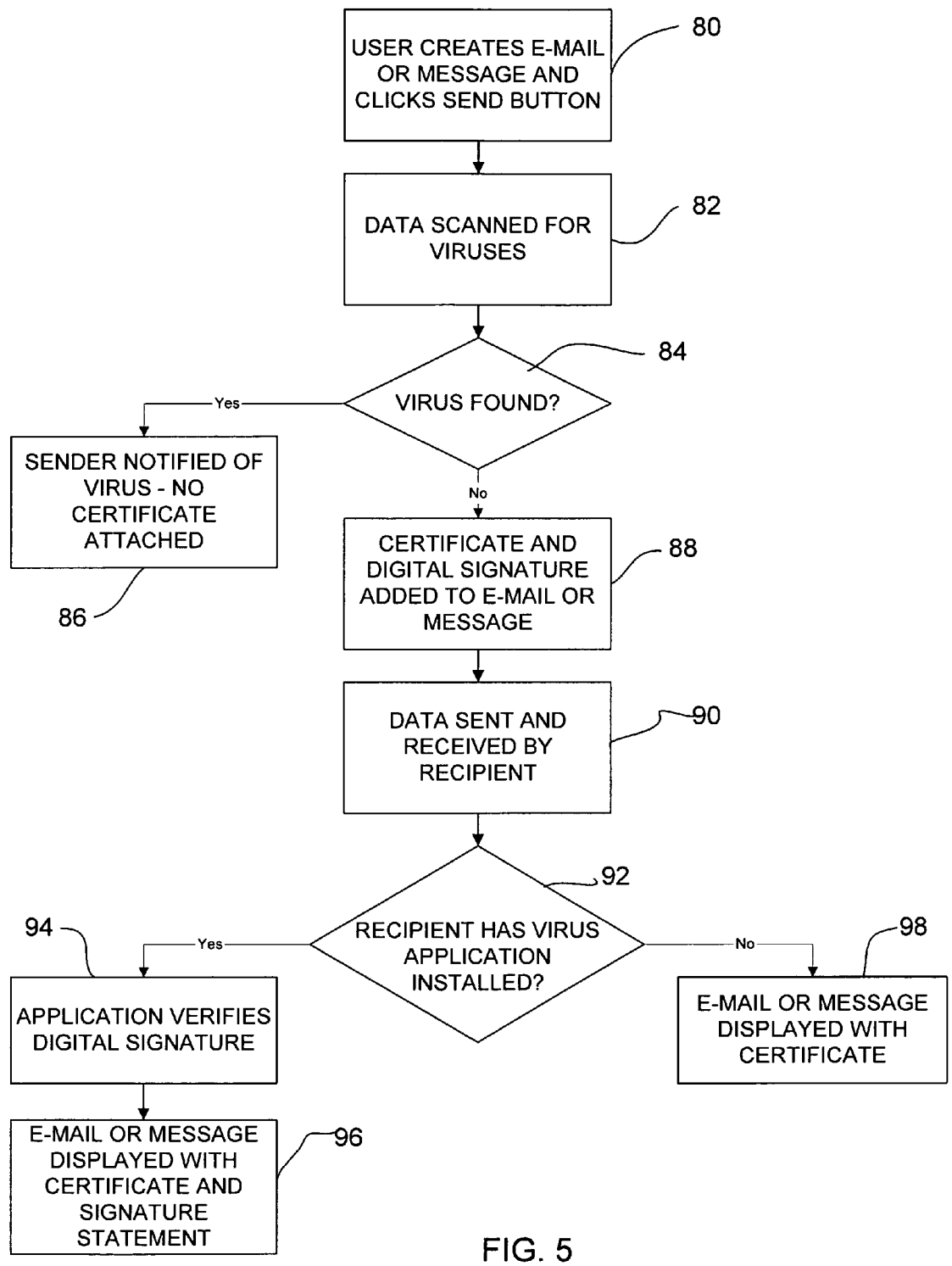
FIG. 5 is a flowchart illustrating a process of the present invention for scanning and certifying e-mail.

FIG. 5 is a flowchart illustrating a process of the present invention for scanning data, such as attachments to e-mails or instant messages, for viruses and certifying that the data is virus free. For example, at step 80 a user creates an e-mail or instant message attaches a file and clicks the send button. The file is then scanned for viruses by the virus scan engine 24 (step 82). If any viruses are found the sender is notified of the virus and no certificate is attached to the e-mail (or message) (steps 84 and 86). The user may also have the option to stop the data from being sent. If no virus is found, certificate 38 and digital signature 40 are added to the e-mail or message (steps 84 and 88). The data is then sent to the recipient (step 90). If the recipient has the digital signature verification application 46 installed on his computer, the application verifies that the data has not been tampered with (steps 92 and 94). The data is then displayed with certificate 38 and digital signature 40 displayed (step 96). If the user does not have the digital signature verification software 46 installed, the e-mail or message is displayed with only the certificate (steps 92 and 98).

Figure 6:
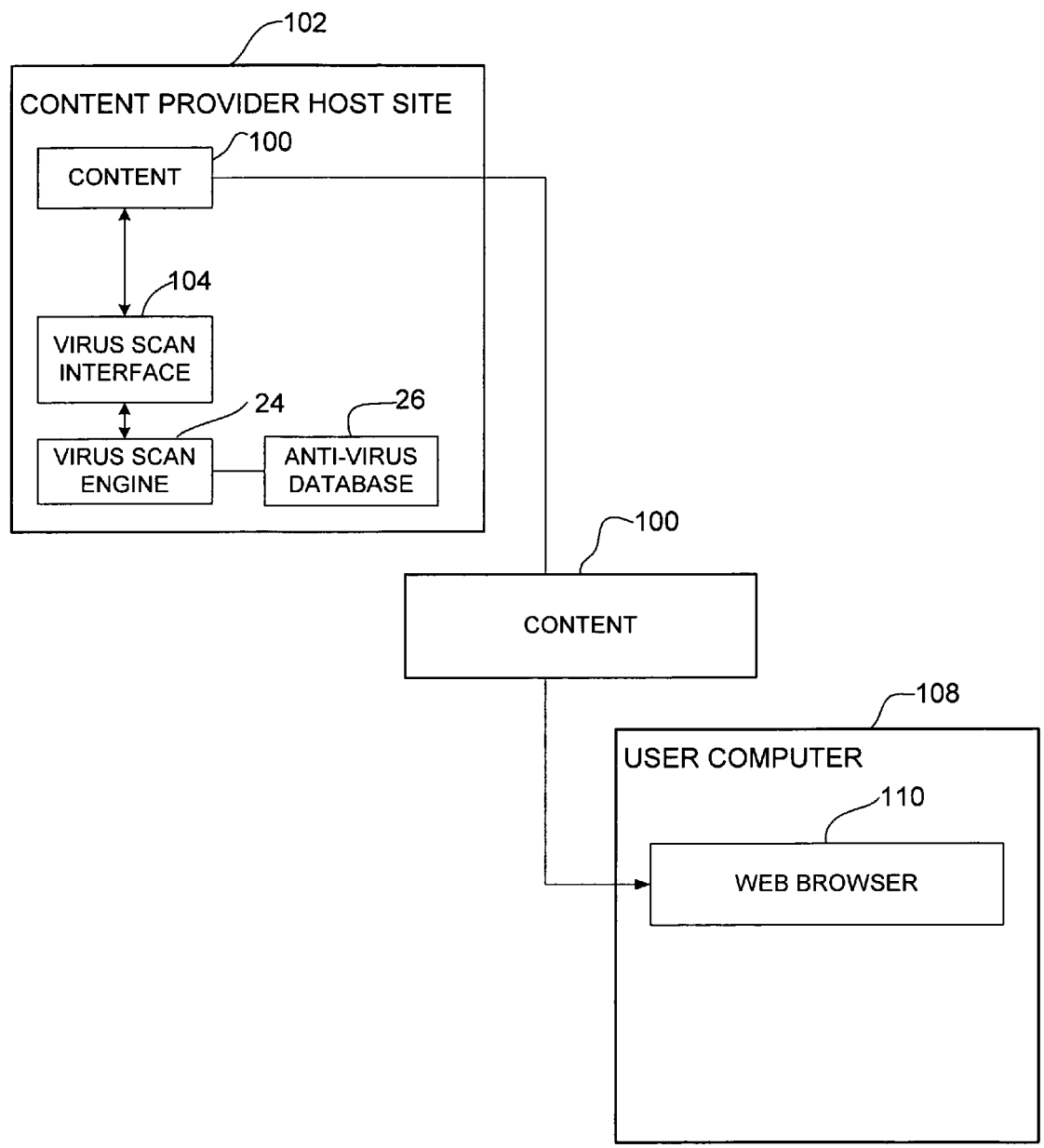
FIG. 6 is a block diagram illustrating a system of the present invention for virus free certification of content available for download at a host site.
Figure 7:
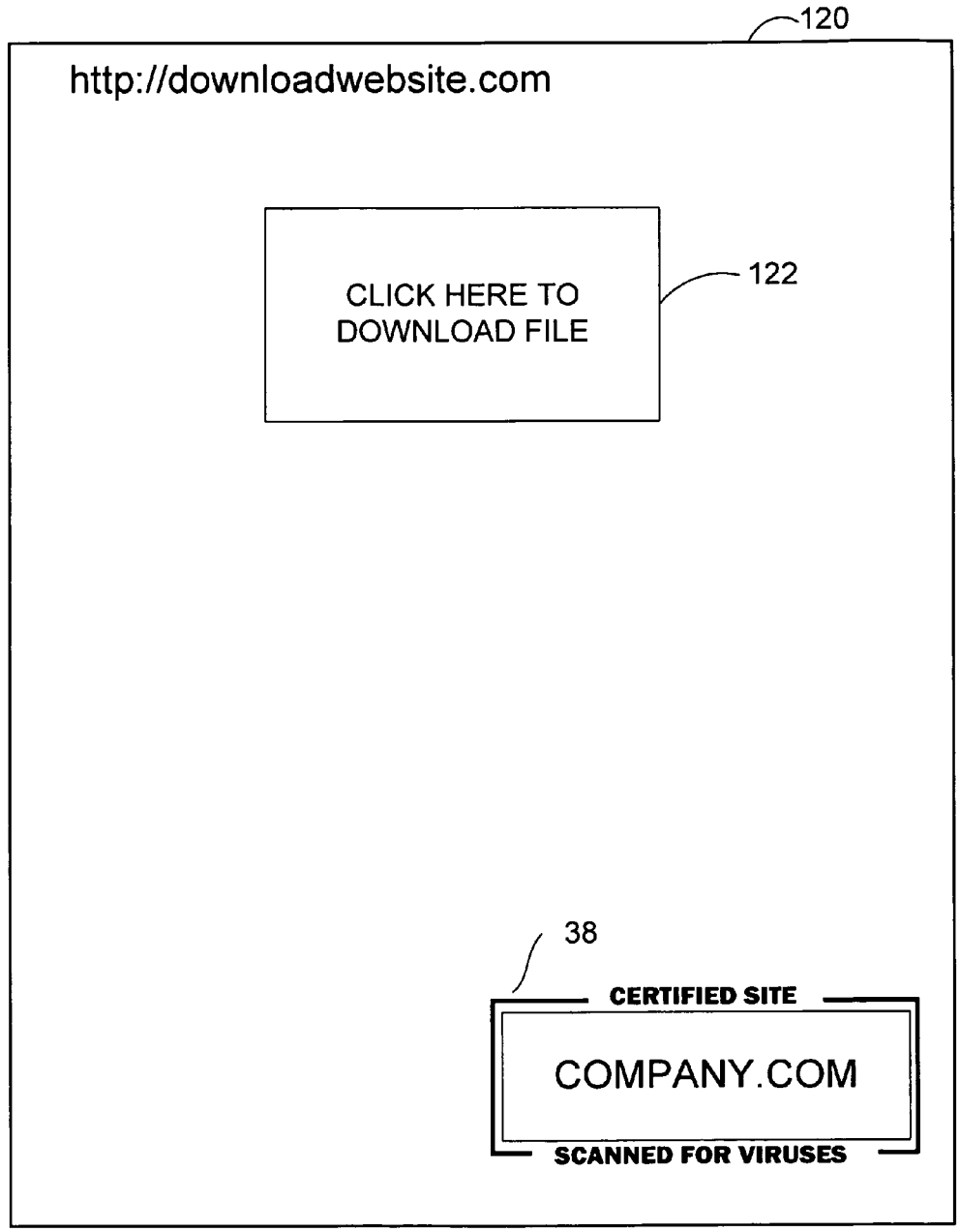
FIG. 7 illustrates an exemplary web page of a certified site.

FIG. 6 illustrates a second embodiment of the present invention for checking content 100 located on a host 102, such as a web site, for viruses and certifying that the content is free of viruses and safe for a user to download on his computer and use. The host site includes virus scan engine 24, anti-virus database 26 and a virus scan interface 104. It is to be understood that the virus scan engine 24 and anti-virus database 26 may also be installed on a different computer and the content scanned on that computer. The content 100 may include, for example, image files, text files, PDF (Portable Document Format) files, software, executable files, applications, or any other content that can be installed at a site and available to download by a user. The virus scan engine 24 may also be used to scan e-mails such as newsletters delivered to the user by the host site 102. User computer 108 may include a web browser 110 for use on the Internet. The content 100 is preferably scanned for viruses every time the anti-virus database 26 is updated so that if the content is infected with a new virus it can be identified, the host site owner notified, and the certificate temporarily removed. FIG. 7 illustrates an example of a certificate 38 displayed on a web site 120 having downloadable content 122. The certificate 38 may be available in a variety of sizes and shapes so that a company can select which certificate can be used for optimum placement on its web pages. It is to be understood that the certificate may include any type of graphics or text, as previously discussed.

Figure 8:
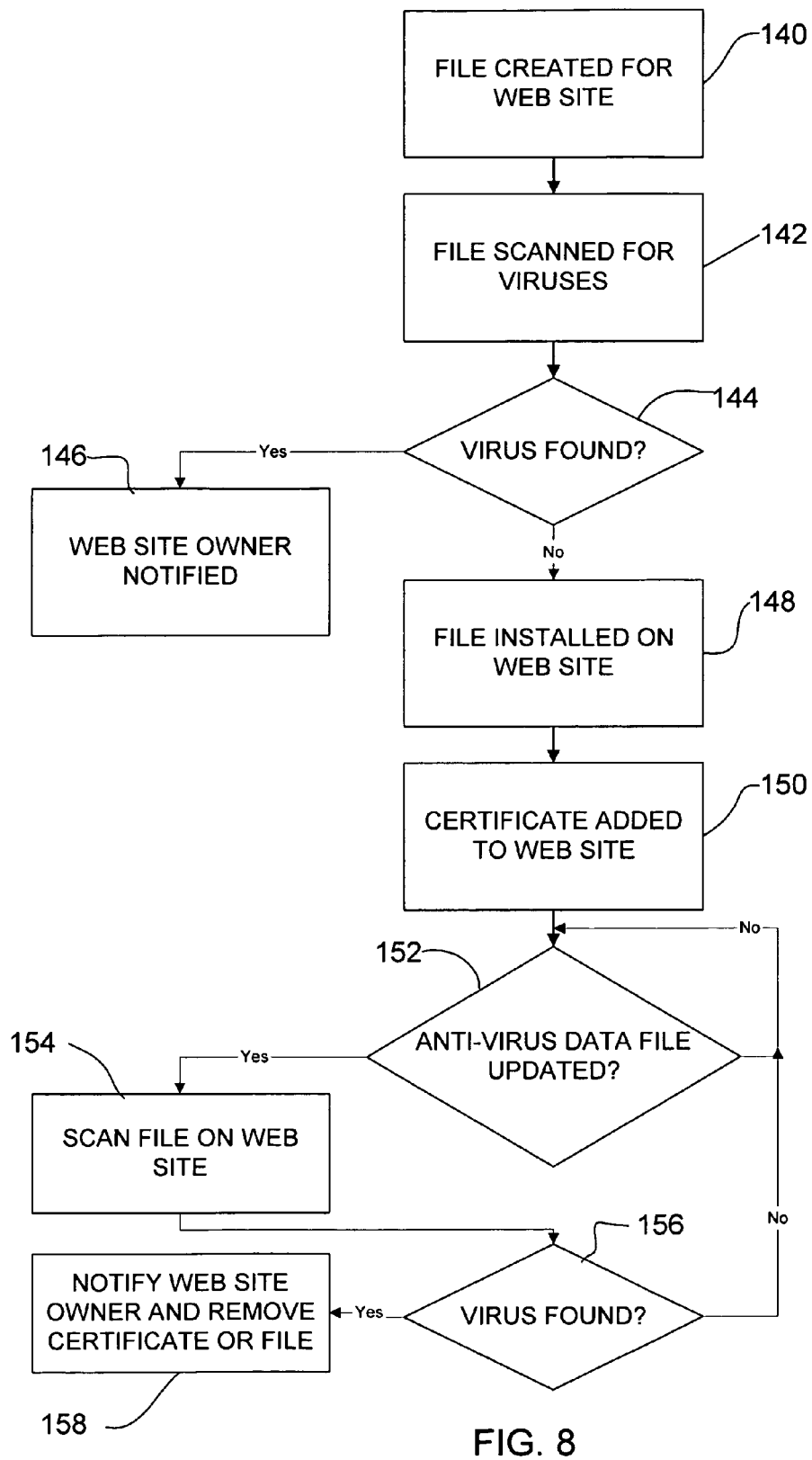
FIG. 8 is a flowchart illustrating a process of the present invention for scanning and certifying content available from a host site.

FIG. 8 is a flowchart illustrating a process for certifying that content contained on a host site is safe to download. The content (e.g., file) is first created at step 140 and scanned for viruses at step 142. If a virus is found the site owner is notified and the file is not loaded on the web site (steps 144 and 146). The virus scan engine 24 may also be configured to automatically clean the infected file or delete the file from the web site if already installed. If the file is clean it is loaded onto the site and certificate 38 is added to the site (if not already included on the site) (steps 144, 148, and 150). If the anti-virus database 26 is updated, the downloadable content already on the site is scanned for viruses (steps 152 and 154). If a virus is found, the web site owner is notified and the file is removed from the web site or the certificate is removed until the file is cleaned (steps 156 and 158). If all content is clean no action is taken until the next time that the anti-virus database is updated.

The certification may also be used on other media such as CD-ROMs. For example, any software or files stored on a CD-ROM may be scanned by virus scanning software before the CD-ROM is created. Users of the CD-ROM are thus reassured by the certification symbol on the CD-ROM label that the content is safe to download or open. The CD-ROM may also include a flash presentation explaining the certification process and listing other anti-virus products that are available.

It will be observed from the foregoing that the method and system described herein provide numerous advantages. Importantly, the method and system allow users sending e-mails to reassure recipients that data received has been checked for viruses and is safe to open. Furthermore, web sites may also use the system to check content for viruses before making the content available on their web site and certifying that all content on the web site is virus free. Since scanning occurs in the background on the host's computer, the recipient of content does not have to bother with scanning content before it is opened on his computer, thus increasing customer usage of the host's site.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for certifying that content available on a host site is free from viruses identified by an anti-virus database, the method comprising:
    scanning content configured for publication on a host site for viruses;
    loading the scanned content onto the host site if no viruses are identified;
    displaying a certificate identifying the content on the host site as being scanned for viruses;
    repeating scanning the content for viruses upon receiving an update to the anti-virus database; and
    removing the certificate from the host site if viruses are identified after repeating the scanning of the content on the host site for the viruses;
    wherein the certificate includes an entity including at least one of a company logo, an icon, and a water marked seal.

2. The method of claim 1 further comprising removing the content from the host site if viruses are identified.

3. The method of claim 1 wherein the host site is a web site on the Internet.

4. The method of claim 1, wherein the certificate is available in a variety of sizes and shapes in order to be optimally placed on the host site.

5. The method of claim 1, further comprising notifying an owner of the host site if viruses are identified.

6. The method of claim 1, wherein the content is not loaded on the host site if viruses are identified.

7. The method of claim 1, further comprising cleaning the content if viruses are identified.

8. The method of claim 1, wherein the certificate is removed until the content is cleaned.

9. The method of claim 1, wherein the certificate is linked to a verification page listing a type and a version of virus scanning software used in scanning the content, where clicking on the certificate obtains more information about the certificate.

10. The method of claim 1, wherein a digital signature is displayed separate from the certificate, and a digital signature verification application is configured to read the digital signature and confirm that the content has not been tampered with.

11. The method of claim 1, further comprising notifying an owner of the host site if viruses are identified after scanning the content on the host site for the viruses.

12. The method of claim 1, wherein the certificate certifies that all of the content that is downloadable from the host site is free from viruses.

13. A non-transitory computer readable medium on which a computer product is embodied, the product comprising:
   computer code that scans content configured for publication on a host site for viruses;
   computer code that loads the content onto the host site if no viruses are identified;
   computer code that displays a certificate identifying the content on the host site as being scanned for viruses;
   computer code that repeats scanning the content for viruses upon receiving an update to the anti-virus database;
   computer code that removes the certificate from the host site if viruses are identified after repeating the scanning of the content on the host site for the viruses; and
   wherein the computer codes are stored on the non-transitory computer readable medium;
   wherein the certificate includes an entity including at least one of a company logo, an icon, and a water marked seal.

14. The computer product of claim 13 further comprising computer code that removes the content from the host site if viruses are identified.

15. The computer product of claim 13 wherein the host site is a web site on the Internet.

16. A system including a non-transitory computer readable medium, the system comprising:
   a processor;
   an anti-virus application operable to scan content for viruses; and
   a certification application operable to display a virus free certificate on the host site and publish the content on the host site when the content is found to be virus free during scanning;
   wherein the system is operable such that scanning of the content for viruses is repeated upon receiving an update to the anti-virus database;
   wherein the system is operable such that the certificate is removed from the host site if viruses are identified after repeating the scanning of the content on the host site for the viruses;
   wherein the certificate includes an entity including at least one of a company logo, an icon, and a water marked seal.

17. The system of claim 16 wherein the anti-virus application includes an anti-virus database containing a list of known viruses and wherein the anti-virus application is configured to automatically scan the content when the anti-virus database is updated.

18. The system of claim 16 wherein the content is removed from the host site if viruses are identified.

19. The system of claim 16 wherein the host site is a web site on the Internet.

* * * * *